United States Patent Office 2,999,092
Patented Sept. 5, 1961

2,999,092
8-AMINO-1-HYDROXY - 13a - METHYL-1H-CYCLO-PENTA [5,6] NAPHTHO - 1,2 - g QUINAZOLINES AND PROCESS
Frank B. Colton, Chicago, and Ivar Laos, Skokie, Ill., assignors to G. D. Searle & Co., Chicago, Ill., a corporation of Delaware
No Drawing. Filed Nov. 20, 1959, Ser. No. 854,238
7 Claims. (Cl. 260—239.5)

This invention relates to polyhydro 8-amino-1-hydroxy-13a-methyl - 1H - cyclopenta[5,6]naphtho[1,2-g]quinazolines and a process for the manufacture thereof. More particularly, this invention relates to chemical compounds of the formula

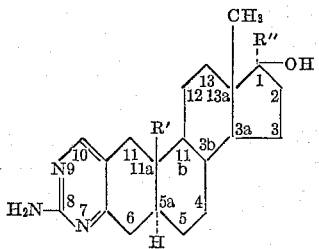

and Δ$^{5a}$ compounds otherwise identical, R′ in the formula being representative of hydrogen or a methyl radical, and R″ representing hydrogen or a lower alkyl radical. Among the lower alkyl radicals represented by R″, methyl and ethyl radicals are preferred.

Equivalent to the foregoing compounds for purposes of this invention are non-toxic acid addition salts thereof, the composition of which may be depicted by

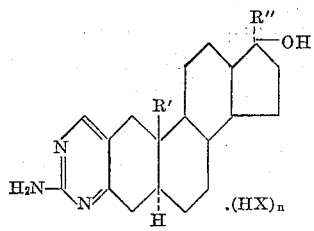

and

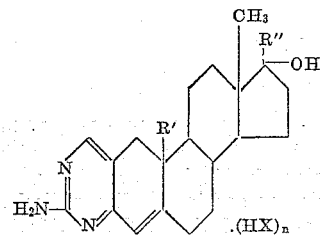

wherein R′ and R″ have the meanings previously assigned; X represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage; and $n$ is a small positive integer, optimally, 1.

The compounds to which this invention relates are useful because of their valuable pharmacological properties. Especially, they are anabolic agents, and as such characterized by an unusual capacity to promote the retention of nitrogen in the animal body.

Manufacture of the basic amines of this invention proceeds by heating an appropriate 2-hydroxymethylenic steriod of the formula

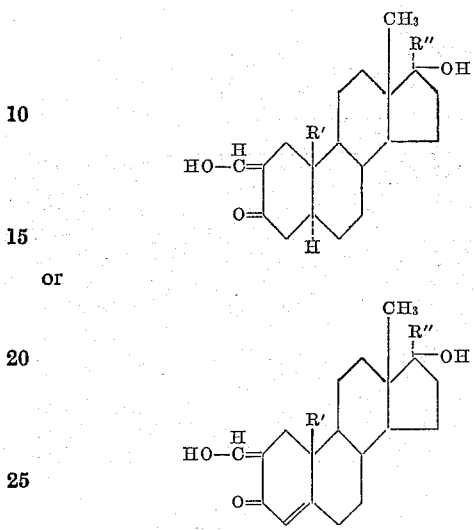

or (R′ and R″ being defined as before) with guanidine or a suitable salt thereof, for example, the carbonate, in an inert anhydrous solvent medium under a protective atmosphere. Conversion of the resultant base to a corresponding acid addition salt is accomplished by simple admixture of the contemplated base with at least one equivalent of any of various inorganic and strong organic acids, the anionic portion of which conforms to X as hereinabove defined.

The fundamental ring system characteristic of the instant compounds is named in accordance with recommendations of The Chemical Abstracts Service.

The following examples describe in detail compounds illustrative of the present invention, and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter set forth, temperatures are given in degrees centigrade and relative amounts of materials in parts by weight, except as otherwise noted.

EXAMPLE 1

8-amino - 2,3,3a,3b,4,5,5a,6,11,11a,11b,12,13,13a-tetradecahydro-1-hydroxy-11a,13a-dimethyl - 1H - cyclopenta-[5,6]naphtho[1,2-g]quinazoline.—A solution of 520 parts of 17β-hydroxy-2-hydroxymethyleneandrostan-3-one and 157 parts of guanidine carbonate in 7800 parts of absolute ethanol protected by an atmosphere of nitrogen is heated at the boiling point under reflux for 20 hours, during which time a light beige precipitate is thrown down. The reaction mixture is then cooled to room temperatures, whereupon the precipitate is filtered off, washed with absolute ethanol, and dried. The resultant material is suspended in 6000 parts of water. The suspension is heated at 90–95° with agitation for 5 minutes, then cooled to room temperatures and filtered. The material recovered on the filter is the desired 8-amino-2,3,3a,3b,4,5,5a,6,11,11a,11b,12,13,13a-tetradecahydro - 1 - hydroxy-11a,13a-dimethyl - 1H - cyclopenta[5,6]naphtho[1,2-g]quinazoline, characterized by absorption bands in the infra-red spectrum at 2.88, 3.0, 3.2, 6.0, 6.2, and 6.4 μ. The product has the formula

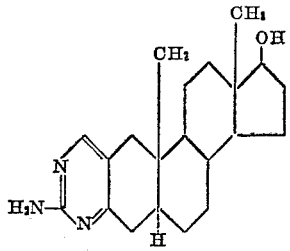

EXAMPLE 2

8-amino - 2,3,3a,3b,4,5,5a,6,11,11a,11b,12,13,13a-tetradecahydro - 1 - hydroxy - 1,11a,13a-trimethyl - 1H - cyclopenta[5,6]naphtho[1,2-g]quinazoline. — Using the technique of Example 1, but substituting 550 parts of 17β-hydroxy - 2 - hydroxymethylene - 17α-methylandrostan-3-one for the 520 parts of 17β-hydroxy-2-hydroxymethyleneandrostan-3-one called for therein, one obtains 8-amino-2,3,3a,3b,4,5,5a,6,11,11a,11b,12,13,13a - tetradecahydro-1-hydroxy - 1,11a,13a-trimethyl - 1H - cyclopenta[5,6]-naphtho[1,2-g]quinazoline, which, recrystallized from dimethylformamide, exhibits absorption bands in the intrared spectrum at 2.88, 3.01, 3.16, 6.00, 6.27, and 6.39μ. The product does not melt below 340°. It has the formula

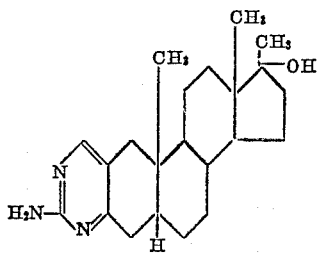

EXAMPLE 3

8-amino - 1 - ethyl - 2,3,3a,3b,4,5,5a,6,11,11a,11b,12,13,13a-tetradecahydro - 1 - hydroxy - 11a,13a - dimethyl-1H - cyclopenta[5,6]naphtho[1,2-g]quinazoline. — Using the technique of Example 1, but substituting 570 parts of 17α-ethyl - 17β - hydroxy - 2-hydroxymethyleneandrostan-3-one for the 520 parts of 17β-hydroxy-2-hydroxymethyleneandrostan-3-one called for therein, one obtains 8-amino-1-ethyl - 2,3,3a,3b,4,5,5a,6,11,11a,11b,12,13,13a-tetradecahydro - 1 - hydroxy - 11a,13a- dimethyl - 1H - cyclopenta[5,6]naphtho[1,2-g]quinazoline, characterized by absorption bands in the infra-red spectrum at 2.88, 3.0, 3.2, 6.0, 6.2, and 6.4μ. The product has the formula

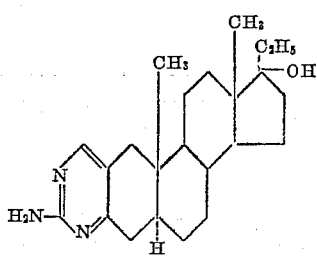

EXAMPLE 4

8-amino - 2,3,3a,3b,4,5,11,11a,11b,12,13,13a - dodecahydro - 1 - hydroxy - 1,13a - dimethyl - 1H - cyclopenta[5,6]naphtho[1,2-g]quinazoline.—Using the technique of Example 1, but substituting a like amount of 17β-hydroxy-2-hydroxymethylene - 17α - methyl-19-normethylandrost-4-en-3-one for the 17β-hydroxy-2-hydroxymethyleneandrostan-3-one called for therein, one obtains 8-amino-2,3,3a,4,5,11,11a,11b,12,13,13a - dodecahydro - 1 - hydroxy - 1,13a-dimethyl - 1H - cyclopenta[5,6]naphtho[1,2-g]quinazoline, characterized by absorption bands in the infra-red at 2.88, 3.0, 3.2, 6.0, 6.2, and 6.4μ. The product has the formula

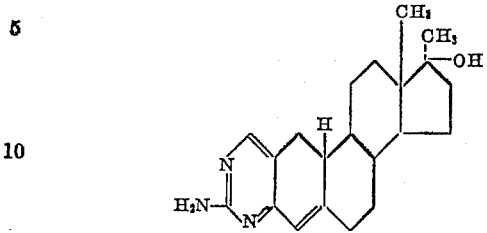

EXAMPLE 5

8-amino - 2,3,3a,3b,4,5,11,11a,11b,12,13,13a - dodecahydro - 1 - hydroxy - 1,11a,13a - trimethyl - 1H - cyclopenta[5,6]naphtho[1,2-g]quinazoline. — Using the technique of Example 1, but substituting 550 parts of 17β-hydroxy-2-hydroxymethylene - 17α - methylandrost - 4-en-3-one for 520 parts of 17β-hydroxy-2-hydroxymethyleneandrostan-3-one called for therein, one obtains 8-amino-2,3,3a,3b,4,5,11,11a,11b,12,13,13a - dodecahydro-1-hydroxy - 1,11a,13a - trimethyl - 1H - cyclopenta[5,6]naphtho[1,2-g]quinazoline, which, recrystallized from dimethylformamide, melts at 327–332° and exhibits absorption bands in the infra-red spectrum at 2.88, 3.00, 3.20, 6.01, 6.16, 6.27, and 6.42μ. The product has the formula

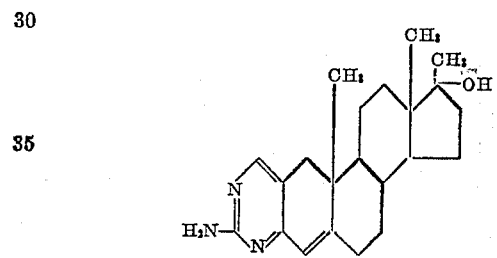

What is claimed is:
1. A compound selected from the group consisting of compounds of the formula

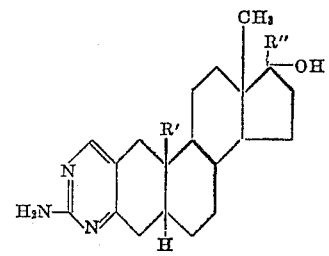

and Δ⁵ᵃ compounds otherwise identical, R' in the formula being selected from the group consisting of hydrogen and methyl radicals and R" being selected from the group consisting of hydrogen and lower alkyl radicals.

2. 8 - amino - 2,3,3a,3b,4,5,5a,6,11,11a,11b,12,13,13a-tetradecahydro - 1 - hydroxy - 11a,13a - dimethyl - 1H-cyclopenta[5,6]naphtho[1,2-g]quinazoline.

3. 8 - amino - 2,3,3a,3b,4,5,5a,6,11,11a,11b,12,13,13a-tetradecahydro - 1 - hydroxy - 1,11a,13a - trimethyl - 1H-cyclopenta[5,6]naptho[1,2-g]quinazoline.

4. 8-amino - 1 - ethyl - 2,3,3a,3b,4,5,5a,6,11,11a,11b, 12,13,13a -tetradecahydro - 1 - hydroxy - 11a,13a-dimethyl-1H-cyclopenta[5,6]naphtho[1,2-g]quinazoline.

5. 8-amino - 2,3,3a,3b,4,5,11,11a,11b,12,13,13a-dodecahydro - 1 - hydroxy - 1,13a-dimethyl - 1H - cyclopenta[5,6]naphtho[1,2-g]quinazoline.

6. 8-amino - 2,3,3a,3b,4,5,11,11a,11b,12,13,13a-dodecahydro - 1 - hydroxy - 1,11a,13a - trimethyl - 1H - cyclopenta[5,6]naphtho[1,2-g]quinazoline.

7. In a process for the manufacture of a compound selected from the group consisting of compounds of the formula

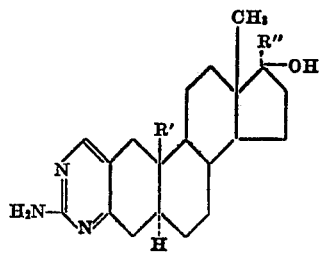

and Δ⁵ᵃ compounds otherwise identical, the step which comprises heating guanidine carbonate in an inert anhydrous solvent medium with a 2-hydroxymethylene steroid selected from the group consisting of compounds of the formula

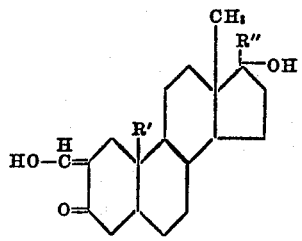

and Δ⁴ compounds otherwise identical, R' in each of the foregoing formulas being selected from the group consisting of hydrogen and methyl radicals and R" in each of said formulas being selected from the group consisting of hydrogen and lower alkyl radicals.

References Cited in the file of this patent

Fieser and Fieser, "Steroids," Reinhold Pub. Corp., New York, 1959, page 1.